W. H. Halsey.

Making Hard Rubber Articles.

No. 3,974. Reissued May 17, 1870.

Witnesses:
Fred S. Dean
Jos. G. E. Larma

Halsey's
Assignee of W. H. Halsey
Per J. J. Dean Atty

United States Patent Office.

HALSEY'S PATENT BOX AND CASE COMPANY, OF NEW YORK, N. Y., ASSIGNEES OF WILLIAM H. HALSEY.

*Letters Patent No.* 81,082, *dated August* 18, 1868; *reissue No.* 3,974, *dated May* 17, 1870.

DIVISION No. 2.

IMPROVEMENT IN NEW ARTICLES OF MANUFACTURE FROM HARD RUBBER.

The Schedule referred to in these Letters Patent and making part of the same

*To all whom it may concern:*

Be it known that WILLIAM H. HALSEY, of Hoboken, in the county of Hudson and State of New Jersey, invented a new and useful Article of Manufacture from Hard Rubber or like material, such as watch-cases, lockets, boxes, and other articles, the different parts of which are required to hinge together by molding such articles in dies, and, at the same time, and by the peculiar construction of the dies, inserting in and attaching thereto metallic or other suitable plates for hinges; and that the following is a full, clear, and exact description thereof, and of its mode or manner of operation, reference being had to the accompanying drawings and to the letters of reference marked thereon, and making a part of this specification.

The method or process of forming and shaping, by means of molds or dies, articles made from or composed of hard rubber and similar substances capable of being molded is well known, and has been extensively applied, and in a great variety of ways. When such articles, however, have been so formed, the material or substance of which they are composed is only shaped by the molds or dies, and the surfaces of such articles correspond with the configuration given to the dies. If, however, the article so produced has been of such a character as a box or case that it has been desired that one part should hinge to or turn upon another, and a metallic hinge is required, it has been necessary to attach the hinge thereto after such article has been molded to the shape or pattern preferred, and fasten the same by rivets or some equivalent manner, such method of attaching a hinge also requiring particular care, and greatly increasing the cost of construction.

This invention consists in such a method or process of making or forming watch-cases, lockets, boxes, and other articles from hard rubber, or other similar material capable of being molded, that an attachment or device such as a hinge or hinge-plate can be firmly and securely attached to or inserted in the article or material molded in and by the same process or operation by which such article or material is molded, and without requiring the use of rivets or similar fastenings to be applied after the article is removed from the molds or dies, and in such a manner that a perfect union will be produced.

The figures represent a series of dies designed to form the different parts of a watch-case, and, at the same time, attach the necessary hinges thereto.

The process of attaching a metallic hinge to a watch-case, or locket, box, or other article made of hard rubber or similar material, while such article is being molded, is substantially as follows:

A plate of metal, *a*, is cut out, struck up, or otherwise formed to correspond in form with the part of the article to which it is to be fixed. To such plate are soldered the two small tube-sections 1 1, to form one part of the hinge. A similar plate, *a'*, fig. 10, having a single tube-section, 2, soldered thereto, and so placed thereon that, when the two plates *a a'* are brought together, the tube-section 2 will enter between the tube-sections 1 1, and such tube-sections 1, 2, 1 form a continuous tube, constitutes the other part of the hinge.

Figure 3:
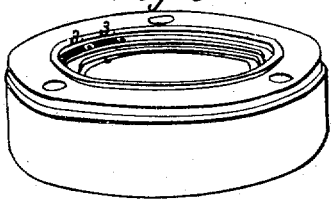

In one of the dies, fig. 3, at the place where it is desired to fix the hinge in the article to be molded, are cut two recesses or cavities, 3 3, of a size and depth a little greater than the hinge or tube-sections 1 1, so that, when the plate *a* is placed on the dies, and the tubes 1 1 enter the cavities 3 3, and pressure is applied to the dies, (the material to be molded being placed between or within the dies, and over the plate *a*,) the pressure will be upon and against the plate *a*, and not upon the tube or hinge-sections 1 1.

Such plate *a* can be held more truly and firmly in position during the operation of forming or molding the article, by means of little pins 4, 4, 4, which project from such plate on the same side with the tube-sections 1 1, and which enter into corresponding holes made in the die, as shown in fig. 3.

Figure 1:
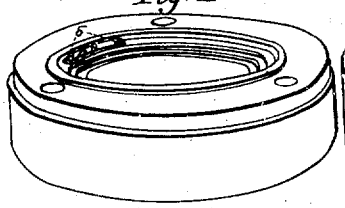
Figures 1, 2, 3 represent a set of dies for forming the rim of a watch-case, and fixing thereto one part of a hinge.
Figure 6:
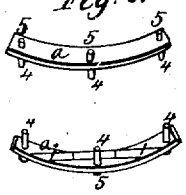
Figure 6 is an enlarged representation of the part of the hinge fixed to such rim, showing the opposite sides of such plate.

Upon the opposite side of such plate *a*, on the side over and against which the material to be molded is to be pressed, are fixed two, or three, or any required number of blunt pins or projections, 5, 5, 5, figs. 1 and 6, over and around which the material will be forced when pressure is applied to the dies. Such projections 5, 5, 5 should be somewhat expanded at their ends, so as to form a sort of head, to cause the uniting of the plate and such molded material to be more perfect; and the sides of such projections may also be made rough or barbed.

In articles in the use of which there is likely to be much tension or strain upon the metallic hinge, the heading and barbing of the projections 5, 5, 5 is more important. In small articles, such construction, particularly as to the barbs, is less necessary. The edges of such plates over which the material is intended to be pressed may also be beveled, so that a sort of dove-tail-joint will be formed by or between the metallic plate and the inclosing or covering-material; and the edges of the bevel may also be serrated.

Fig. 1 represents one of the dies for forming a watch-rim, with a hinge-plate, *a*, in position within it, and ready to receive the material to be molded.

Figure 2:
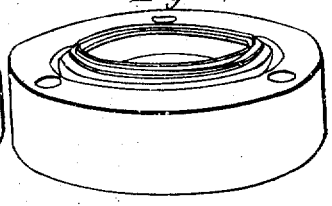

Fig. 2 shows the complement die to fig. 1, with a watch-rim of India rubber resting within it.

Fig. 3 shows the same die as fig. 1 previous to the plate *a* being placed in position.

Figure 4:
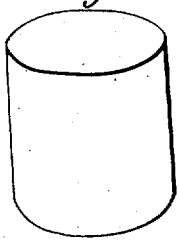
Figure 4 shows the central part of such dies.
Figure 5:
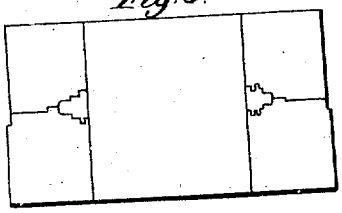
Figure 5 is a vertical section of such a die when the several parts are in position, and showing also the rim made from hard rubber.

Figure 4 is the central part of the die, and around which the watch-rim is formed.

In making an article, as the central rim of a watch-case, upon both sides of which other parts are to be hinged, both the dies, figs. 1 and 2, will require to be cut or recessed, as shown in fig. 3, so as to receive a hinge-plate, *a*, to be attached to each side of the rim; but, if a hinge is required upon but one side of such article, then only one of the dies will have to be recessed.

Figure 8:
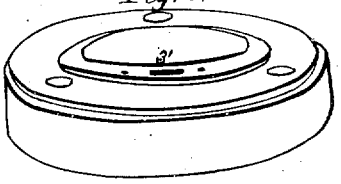
Figures 7, 8, 9 represent a set of dies for forming one of the outer caps of the watch-case, and fixing thereto the part of the hinge connecting with that part of the hinge fixed to the rim.
Figure 10:
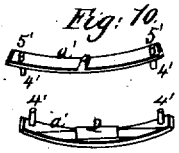
Figure 10 is an enlarged representation of the part of the hinge fixed to such caps, showing its opposite sides.

The plate *a'*, fig. 10, upon which is the counterpart of the hinge, is constructed substantially as before described in respect to the supporting-pins 4' 4' and the projecting points 5' 5' 5', to take the molded material; but, as such plate carries but one tube or hinge-section 2, the die in which such plate is to be laid will require to have made in it but one recess or cavity, 3', as seen in fig. 8.

Figure 9:
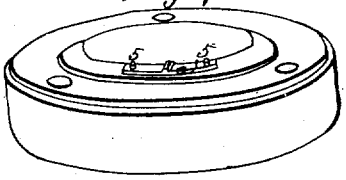
Figure 7:
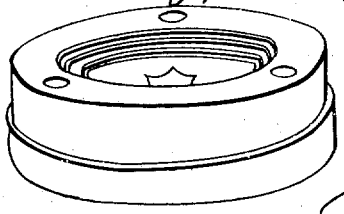
Figure 11:
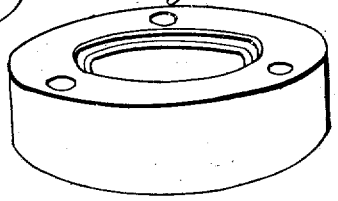
Figures 11, 12 represent a set of dies for forming the inner cap of a watch-case.
Figure 12:
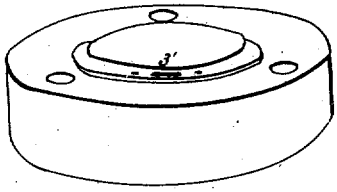

The plate *a'* is shown in fig. 9 placed in proper position in the die, and fig. 8 shows the same die before such plate is laid therein.

The hinge-plates *a a'* having been properly laid in the appropriate dies, the material from which the article is to be molded is placed between the dies or molds, and pressure applied, and the article molded as in ordinary cases. The pressure applied causes the molded material to closely cover and very tightly surround the projecting pins 5 5', or set over and around the beveled or other edges of the metallic plate; and, removed from the molds, such hinge-plates are found to be firmly and permanently connected to the material molded, and even more firmly and closely than if riveted thereto. After the articles are removed from the molds, the pins 4 4' are cut off, and the article is ready for use.

By such process, the article is molded and the metallic hinge firmly and permanently attached thereto by one and the same operation, and without expense or cost, after the dies are once prepared, except merely to form the hinge-plates.

By this process or invention, there is thus performed, and by one and the same operation, the molding or shaping of the articles, heretofore done by one or the first operation; also the fastening the inlaid or inserted plate or hinge, whatever its form, which has generally heretofore had to be done separately and distinct from the others. The fastening of the hinge or hinge-plate is also effected without pins or rivets, being applied after the article is formed or molded, and more permanently than by their use. The whole result is thus obtained, not only with much greater economy, but in a better manner.

By such a process, a more perfect and artistic operation or result can be obtained than when the hinge or hinge-plate is inserted in or attached to the article after it is molded, and fastened by rivets, or by any artificial means.

The pressure requisite to cause the hard rubber or other similar material to take the form of any mold, is sufficient to cause the same material to closely surround and tightly grasp or embrace the hinge-plate which it may be desired to permanently attach to it, while, by the cutting away or recessing of the dies, pressure is relieved at that part where it would, if applied as elsewhere, necessarily destroy or injure the parts.

What is claimed in this application as the invention of said HALSEY is—

As a new article of manufacture, watch-cases, lockets, and other articles, when made of hard rubber or like substance or material, and having hinges or hinge-plates inserted in and fixed thereto at the same time they are molded, by means of dies constructed substantially as described.

WM. H. HALSEY.

Witnesses:
S. D. LAW,
FRED. B. SEARS.